(12) United States Patent
Schuurman

(10) Patent No.: US 6,554,027 B1
(45) Date of Patent: Apr. 29, 2003

(54) ELECTROMAGNETICALLY CONTROLLED SEAT VALVE

(75) Inventor: Raymond Schuurman, Schwieberdingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/417,439

(22) Filed: Oct. 13, 1999

(30) Foreign Application Priority Data

Oct. 14, 1998 (DE) .......................................... 198 47 304

(51) Int. Cl.⁷ .............................................. F16K 11/04
(52) U.S. Cl. ................ 137/881; 137/115.09; 137/119.1
(58) Field of Search ....................... 137/115.09, 115.13, 137/115.25, 118.06, 119.1, 601.18, 870, 881

(56) References Cited

FOREIGN PATENT DOCUMENTS

| DE | 43 42 591 A1 | 6/1995 |
|---|---|---|
| DE | 195 19 890 A1 | 7/1996 |
| DE | 44 31 457 C2 | 2/1997 |
| DE | 93 21 431 U1 | 3/1998 |

*Primary Examiner*—John Fox
(74) *Attorney, Agent, or Firm*—Michael J. Striker

(57) ABSTRACT

An electromagnetically controlled pressure regulating valve includes a hollow housing bounding a user channel having one end to be connected to a hydraulic medium user and another end, and respective supply and a discharge channels communicating with the interior of the housing between the ends, and at other end of the user channel, respectively. A closing member is mounted in the housing for movement toward and away from a closing position in which it sealingly separates the user channel from the discharge channel and is acted upon at the other end of the user channel by an armature with a variable combined force applied to the armature by an electrically energizable coil and by a return spring. A throttling device including at least two throttling orifices extending in fluid flow parallelism with one another between the supply and user channels and each having a length and a transverse dimension that are in a ratio of at least 2:1 is interposed between the supply and user channels.

7 Claims, 1 Drawing Sheet

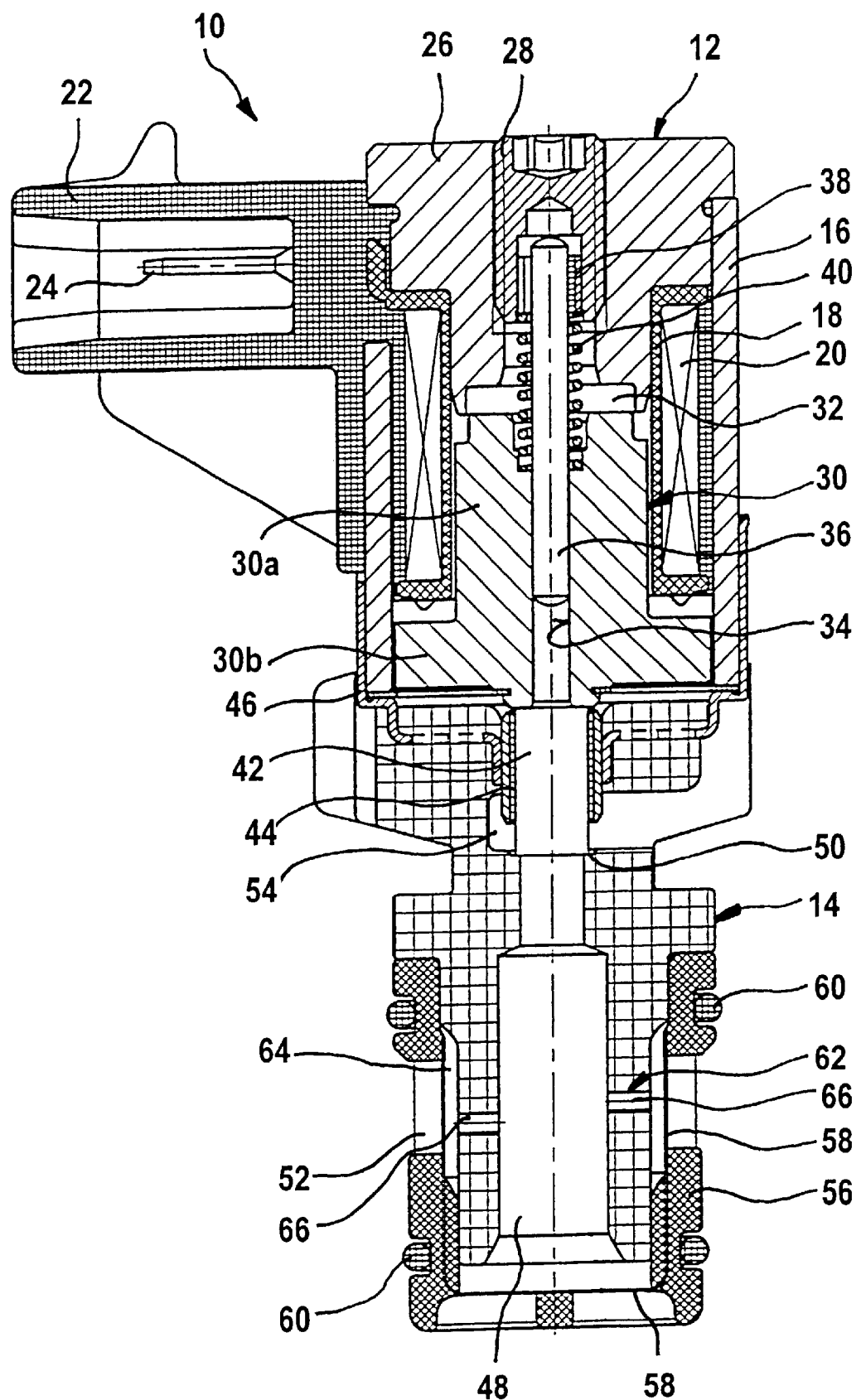

ELECTROMAGNETICALLY CONTROLLED SEAT VALVE

BACKGROUND OF THE INVENTION

1. Field of the Invention

The present invention relates to fluid-flow control devices in general, and more particularly to electromagnetically controlled seat valves.

2. Description of the Related Art

There are already known various constructions of electromagnetically controlled pressure regulating valves, among them that disclosed in the German patent publication DE 44 31 457 C2. In order for the characteristic response lines of this known pressure regulating valve to exhibit behavior that is to a large extent independent of the temperature and thus of the viscosity of the pressurized medium, the valve connection element of this pressure regulating valve is provided with a throttling orifice in the pressurized medium supply path which includes sections of differing cross-sectional shapes. A throttling device of this kind presents a resistance to the flow of the pressurized medium, which reduces the pressure that is in effect at the valve seat. As a result, the range over which the pressure of the medium can be regulated is increased, with simultaneous reduction in the temperature-dependent resistance contribution of the valve seat. Therefore, the pressure regulating valve of this construction exhibits a reduced residual pressure, that is reduced differences between the characteristic response lines applicable when the pressurized medium is warm and cold, respectively.

In order to achieve a minimum residual pressure, the throttling device must effect a considerable pressure build-down or reduction at very cold temperatures of the pressurized medium. This, however, is accompanied by a low volume of flow through this conventionally constructed pressure regulating valve. Yet, at relatively high temperatures, that is when the pressurized fluid exhibits relatively low viscosity, the unavoidably leakage in the user circuit that is connected to the pressure regulating valve is so high that a high flow-through volume of the pressurized medium through the valve would be required to compensate for it, lest the regulated pressure of the pressurized medium suffer detrimental consequences, such as a pressure break-down. In order to fulfil these countervailing requirements in the most optimal manner achievable, the pressure regulating valve should have as high a ratio between the flow-through volume at high and low temperatures of the pressurized medium as possible or feasible. Unfortunately, the values of this obtainable by using the pressure regulating valve of this known constructions leave much to be desired at least as far as certain applications of the valve are concerned.

OBJECTS OF THE INVENTION

Accordingly, it is a general object of the present invention to avoid the disadvantages of the prior art.

More particularly, it is an object of the present invention to provide an electromagnetically controlled seat valve that does not possess the drawbacks of the known valves of this type.

Still another object of the present invention is to devise a valve of the type here under consideration in which the ratio between the flow-through volumes at high and low temperatures would exceed that available from known valves of this type.

It is yet another object of the present invention to design the above valve in such a manner that differences between its characteristic response lines at high and low temperatures are improved relative to those of the prior art.

A concomitant object of the present invention is so to construct the valve of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in an electromagnetically controlled seat valve that includes a hollow housing bounding a user channel having one end to be connected to a hydraulic medium user and another end, and respective supply and a discharge channels communicating with the interior of the housing between the ends, and at other end of the user channel, respectively. A closing member is mounted in the housing for movement toward and away from a closing position in which it sealingly separates the user channel from the discharge channel. Further accommodated in the housing, at the other end of the user channel, is means for applying a variable closing force to the closing member to urge the latter toward the closing position thereof, such applying means including an electrically energizable coil, an armature mounted between the coil and the closing member for relative movement in response to electromagnetic forces exerted by the latter when energized, and a return spring urging the armature in a direction corresponding to the closed position of the closing member. Last but not least, there is provided throttling means interposed between the supply and user channels for determining the amount of the hydraulic medium supplied into the user channel and hence the force with which this medium acts on the closing member against the variable closing force to open the closing member and thus establish a pressure-relieving communication between the user and discharge channels, such throttling means including in accordance with the present invention at least two throttling orifices extending in fluid flow parallelism with one another between the supply and user channels and each having a length and a transverse dimension that are in a ratio of at least 2:1.

A particular advantage obtained by using the seat valve of the present invention as described so far is that the ratio between the flow-through pressurized medium volume at high and low temperatures is significantly improved as compared with the state of the art, as a result of the special construction of the throttling device or means as proposed by the present invention. To this end, the single orifice of a larger size that had been customarily used up to now has been replaced in accordance with the present invention with a plurality of smaller-size throttling orifices that are spaced from each other but are arranged parallel to one another as far as the flow of the pressurized medium through them is concerned. Individual throttling orifices with smaller sizes have a higher throttling effect on the medium flowing through them, and hence permit less of the medium to flow through them, at relatively low temperatures than the aforementioned larger-size single throttling orifice. On the other hand, the flow-through volume needed for reliable operation at higher temperatures can be assured by appropriately choosing the number of the individual throttling orifices.

According to a articularly advantageous feature of the present invention, the housing includes a wall portion that bounds the user channel at the supply channel, separating these channels from each other, and the throttling orifices extend through this wall portion substantially radially with respect to the user channel, being distributed over the circumference of the wall portion. The throttling orifices may advantageously have flow-through cross-sectional areas of sizes and/or shapes that are different from one another. As a result of this, the pressure regulating valve can be fitted to various requirements that may be applicable for different instances of use of a valve of this construction.

It is especially advantageous when, in accordance with another facet of the present invention, the housing includes an injection-molded valve part of a synthetic plastic material that is provided with the supply, user and discharge channels in a ready-to use form during the injection molding process of its manufacture. When this approach is being used, hardly any extra expenses are incurred as the result of the provision of the plurality of throttling orifices. It is also advantageous when the pressure regulating valve is constructed as a seat valve in that its housing includes a valve seat surrounding the other end of the user channel and the closing member cooperates with the valve seat to interrupt and establish communication past the latter between the user and discharge channels.

The present invention is also directed to an automatic transmission for a motor vehicle, which includes an electromagnetically controlled seat valve of the above construction, that is one including a hollow housing bounding a user channel having one end to be connected to a hydraulic medium user and another end, and respective supply and a discharge channels communicating with the interior of the housing between the ends, and at other end of the user channel, respectively; a closing member mounted in the housing for movement toward and away from a closing position in which it sealingly separates the user channel from the discharge channel; means in the housing at the other end of the user channel for applying a variable closing force to the closing member to urge the latter toward the closing position thereof, including an electrically energizable coil, an armature mounted between the coil and the closing member for relative movement in response to electromagnetic forces exerted by the latter when energized, and a return spring urging the armature in a direction corresponding to the closed position of the closing member; and throttling means interposed between the supply and user channels for determining amount of the hydraulic medium supplied into the user channel and hence the force with which this medium acts on the closing member against the variable closing force to open the closing member and thus establish a pressure-relieving communication between the user and discharge channels, including at least two throttling orifices extending in fluid flow parallelism with one another between the supply and user channels and each having a length and a transverse dimension that are in a ratio of at least 2:1. Automatic transmissions of this construction, i.e. including the valves constructed in accordance with the present invention, show improved performance over those of the prior art, especially as far as their gear-switching properties under various operating conditions are concerned.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE of the drawing is an axial sectional view of a fuid seat valve of the present invention.

DETAILED DESCRIPTION OF THE PREFERRED EMBODIMENT

Referring now to the drawing in detail, and first to FIG. 1 thereof, it may be seen that the reference numeral 10 has been used therein to identify a fluid pressure regulating valve of the present invention in its entirety. The valve 10 includes, as its main constituent components, a magnet part 12 and a valve part 14 that is arranged coaxially with and is rigidly connected to the magnet part 12. The magnet part 12 includes a sleeve-shaped housing 16 in the interior of which there is accommodated, surrounding or wound around a coil body 18, a coil 20. The coil 20 is also sleeve-shaped and is provided with a substantially radially projecting contact socket 22 that is of an injection molded synthetic plastic material. The contact socket 22 is provided with respective electrical contacts 24 that are connected with the coil 20, in order to supply electric current thereto, by respective insulated or embedded electrical conductors that are not visible in the drawing.

The outwardly facing end portion of the coil 20 is closed off by a coil core 26 which partially penetrates into the interior of the coil 20. Centrally in the coil core 28, there is situated a threaded socket 28 that is positionally adjustable from the exterior of the valve 10. At the oppositely situated second end of the coil 20, there is situated an armature 30 which is substantially T-shaped in cross-section, including a stem 30a that penetrates into the interior of the coil 20 and a head 30b that is juxtaposed with the adjacent end of the coil 20. The armature 30 is guided in the coil 20 for axial movement. In the illustrated initial condition of the valve 10, a spacing is present between the stem 30a of the armature 30 and the coil core 16, this spacing constituting an operational air gap 32 for the pressure regulating valve 10.

The armature 30 has a through bore 34 extending along its longitudinal axis. Press-fitted into this through bore 34 is a portion of a pin 36 that projects beyond the armature 30 at its end that extends toward the coil core 26. At that location, the pin 36 cooperates for the guiding of the armature 30 with a sliding bearing bushing 38 which is accommodated in a blind bore of the threaded socket 28. In addition to that, the pin 36 serves for centering of a return spring 40 which braces itself against the threaded socket 28, on the one hand, and against the armature 30, on the other hand. The degree of pre-stressing of this return spring 40 is adjustable by appropriately selecting the depth to which the threaded socket 28 is threaded in.

The end of the armature 30 that is closer to the valve part 14 is provided with a central extension against which a closing member 42 abuts. The latter is configured as a solid piston that is supported in a piston guide 44 of the valve part 14 for axial sliding displacement. The valve part 14 is made of a suitable synthetic plastic material by using an injection molding technique, and is equipped with a metallic holder 46. The valve part 14 is fixed in position on the housing 16 of the magnet part 14 by means of this metallic holder 46 which extends beyond the valve part 14. The holder 46 further has a portion that is embedded in or surrounded by the valve part 14 and the diameter of which is reduced several times until the interior of its portion exhibiting the smallest outer diameter forms a receptacle for the piston guide 44.

The valve part 14 is provided with a through passage extending in the longitudinal or axial direction of the valve 10; the end of this passage that is remote from the magnet part 12 is connected, in a manner that has not been specifically illustrated in the drawing, with a hydraulic fluid user.

Consequently, this passage constitutes a user channel 48 of the valve 10. The diameter of this user channel 48 is offset or changed once at the end of the channel 48 that is closer to the magnet part 12 in order to form a valve seat 50, while the diameter of the closing member 42 is larger at the region of the valve seat 50 than that of the remainder of the user channel 48.

Extending transversely with respect to the user channel 48, a supply channel 52 and a discharge channel 54 are provided in the valve part 14. Each of these channels 52 and 54 opens substantially at a right angle into the user channel 48; the manner in which the supply channel 52 communicates with the user channel 48 will be explicitly addressed at a later point of this description. The discharge channel 54 is situated at a region closer to the magnet part 12, whereas the supply channel 52 is disposed at a region closer to the other, free end of the valve part 14. A pressurized medium connection between the supply channel 52 and the discharge channel 54 is controlled by the closing member 42 which, when no electric current flows through the coil 20, is pressed by the force exerted on it by the return spring 40 against the valve seat 50 and thus fully interrupts this connection in a pressure-tight manner.

In order to protect the interior of the pressure regulating valve 10 as well as the user that is connected to the latter from impurities that may be carried by the pressurized hydraulic medium, the valve part 14 is equipped with a filter cage 56. This filter cage 56 has a cup-shaped configuration and is pressed onto the free end of the valve part 14. At the region of the supply channel 52 and of the user channel 48, the filter cage 56 includes a freely extending filter mesh 58. The latter is constructed as a continuous filter mesh strip. The filter cage 56 is produced by injection molding of synthetic plastic material around this filter mesh strip. Receiving grooves are provided at the periphery of the filter cage 56 for sealing rings 60 that sealingly separate the supply channel 52 with respect to the discharge channel 54 and the user channel 48, respectively.

The regulation of the pressure prevailing in the user channel 48 is accomplished in a manner that is known per se, by controlling the amount of electric current flowing through the coil 20. In dependence on the power furnished by this electric current, the coil 20 acts with a variable force on the armature 30, so that this force, in conjunction with that exerted by the return spring 40, determines the opening force for the closing member 42. This combined force is opposed by the force to which the pressurized medium in the user channel 48 subjects the closing member 42. In the event that this opposing force even slightly exceeds the combined force, the closing member 42 permits communication between the user channel 48 and the discharge or pressure relief channel 54 and thus regulates the pressure in the user channel 48 to the corresponding pressure level.

In order to be able to regulate this pressure over as large a pressure range as possible, it is known to provide a throttling device 62 in the pressurized medium supply path of the pressure regulating valve 10, with this throttling device 62 reducing the pressure level of the pressurized medium supplied from a non-illustrated supply pump at a region situated upstream of the valve seat 50. This, of necessity, goes hand-in-hand with a reduced volume of the pressurized medium flowing through such a throttling device 62. However, when the flowing pressurized hydraulic medium has a relatively low viscosity, for instance when it is at a relatively high temperature, this can result in a collapse of the pressure level at the user, in that the unavoidable pressurized medium leakage in the attached hydraulic system can no longer be adequately compensated for due to the relatively low throughput of the throttling device 62. An undesirable consequence of this is the existence of relatively huge differences in the characteristic response curves of the conventionally constructed pressure regulating valve 10 at different pressurized medium temperatures.

In order to avoid this disadvantage, it is proposed in accordance with the present invention for the aforementioned throttling device 62 to include a plurality of throttling orifices 66 exhibiting relatively small flow-through sectional areas, which are interposed in the supply path at the inlet channel or port 52 and are arranged in parallelism with each other as far as the flow of the hydraulic medium is concerned. To this end, the supply channel 52 initially opens into an annular channel 64 provided at the outer periphery of the valve part 14, and the above-mentioned plurality of the throttling orifices 66 that are spaced from one another establishes respective connections from this annular channel 64 to the user channel 48. In the illustrated embodiment, these throttling orifices 66 extend substantially at right angles relative to the user channel 48; however, this is not necessarily required. The throttling orifices 66 have a length-to-diameter ratio that is substantially greater than 2:1 so that they constitute laminar flow resistances that effect a pressure build-down. The flow volume that is required at the for the pressurized hydraulic medium at relatively high temperatures can be assured within wide ranges, without deleteriously influencing the lower pressure level at the valve seat 50, by the proper selection of the number of the throttling orifices 66. The throttling orifices 66 may be arranged in the wall portion bounding the annular channel 64 is a manner that, for all intents and purposes, can be arbitrarily chosen, so that flow-related influences can be taken into account. Along the same vein, throttling orifices 66 of different flow-through cross-sectional areas and shapes may be paired with one another. As a result of this approach, the pressure regulating valve 10 constructed in accordance with the present invention in the manner described above renders it possible to achieve even widely diverse characteristic response lines and can be especially easily adapted to the respective conditions expected to be encountered in the particular applications of the pressure regulating valve 10. Inasmuch as the valve part 14 is made of a synthetic plastic material in an injection molding process, in which a material-removing aftertreatment of the varius channels and orifices is at least largely avoided, it is possible to obtain the thus arranged and configured throttling orifices 66 in an essentially cost-neutral manner. The pressure regulating valve 10 of this construction behaves independently with respect to temperature variations in the pressurized hydraulic medium and, in either event, exhibits a relatively low residual pressure, i.e. relatively small temperature-caused differences in the course of the characteristic response line.

It will be understood that each of the elements described above, or two or more together, may also find a useful application in other types of constructions differing from the type described above.

While the present invention has been described and illustrated herein as embodied in a specific construction of a pressurized hydraulic medium pressure regulating valve, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting fea tures that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

I claim:

1. An electromagnetically controlled seat valve comprising a hollow housing bounding a user channel having one end to be connected to a hydraulic medium user and another end, and respective supply and a discharge channels communicating with the interior of said housing between said ends, and at other end of said user channel, respectively; a valve part connected with a magnet part and provided with a valve seat; a closing member cooperating with said valve seat and mounted in said housing for movement toward and away from a closing position in which it sealingly separates said user channel from said discharge channel; means in said housing at said other end of said user channel for applying a variable closing force to said closing member to urge the latter toward said closing position thereof, including an electrically energizable coil, an armature mounted between said coil and said closing member for relative movement in response to electromagnetic forces exerted by the latter when energized, and a return spring urging said armature in a direction corresponding to said closed position of said closing member; and throttling means interposed between said supply and user channels for determining the amount of the hydraulic medium supplied into said user channel and hence the force with which this medium acts on said closing member against said variable closing force to open said closing member and thus establish a pressure-relieving communication between said user and discharge channels, including at least throttling orifices extending in fluid flow parallelism with one another between said supply and user channels and each having a length and a transverse dimension that are in a ratio of at least 2:1.

2. The electromagnetically controlled pressure regulating valve as defined in claim 1, wherein said housing includes a wall portion that bounds said user channel at said supply channel, separating the latter from the former; and wherein said throttling orifices extend through said wall portion substantially radially with respect to said user channel, being distributed over the circumference of said wall portion.

3. The electromagnetically controlled pressure regulating valve as defined in claim 1, wherein said throttling orifices have flow-through cross-sectional areas of sizes that are different from one another.

4. The electromagnetically controlled pressure regulating valve as defined in claim 1, wherein said throttling orifices have flow-through cross-sectional areas of shapes that are different from one another.

5. The electromagnetically controlled pressure regulating valve as defined in claim 1, wherein said housing includes said injection-molded valve part of a synthetic plastic material that is provided with said supply, user and discharge channels in a ready-to use form during the injection molding process of its manufacture.

6. The electromagnetically controlled pressure regulating valve as defined in claim 1, wherein said housing includes said valve seat surrounding said other end of said user channel and said closing member cooperates with said valve seat to interrupt and establish communication past the latter between said user and discharge channels.

7. An automatic transmission for a motor vehicle, comprising an electromagnetically controlled seat valve that includes a hollow housing bounding a user channel having one end to be connected to a hydraulic medium user and another end, a respective supply and a discharge channels communicating with the interior of said housing between said end, and at other end of said user channel, respectively; a valve part connected with a magnet part and provided with a valve seat; a closing member cooperating with said valve sea and mounted in said housing for movement toward and away from a closing position in which it sealingly separates said user channel from said discharge channel; means in said housing at said other end of said user channel for applying a variable closing force to said closing member to urge the latter toward said closing position thereof, including an electrically energizable coil, an armature mounted between said coil and said closing member for relative movement in response to electromagnetic forces exerted by the latter when energized, and a return spring urging said armature in a direction corresponding to said closed position of said closing member; and throttling means interposed between said supply and user channels for determining the amount of the hydraulic medium supplied into said user channel and hence the force with which this medium acts on said closing member against said variable closing force to open said closing member and thus establish a pressure-relieving communication between said user and discharge channels, including at least two throttling orifices extending in fluid flow parallelism with one another between said supply and user channels and each having a length and a transverse dimension that are in a ratio of at least 2:1.

* * * * *